United States Patent [19]

Klose

[11] 3,758,719

[45] Sept. 11, 1973

[54] METHOD AND DEVICE FOR TWO-WAY TRANSMISSION BY MEANS OF TWO-WIRE TRANSMISSION CHANNEL

[75] Inventor: Ulrich Konrad Wilhelm Klose, Lidingo

[73] Assignee: International Business Machines Corporation, Armonk, N.Y.

[22] Filed: Mar. 15, 1972

[21] Appl. No.: 234,763

[30] Foreign Application Priority Data

Mar. 23, 1971 Sweden .............................. 3784/71

[52] U.S. Cl. .............................................. 178/58 R

[51] Int. Cl. .............................................. H04l 5/14

[58] Field of Search .................. 179/15 BY, 15 BM, 179/18 GF, 2 DP, 2 A; 178/58 R, 59, 60; 340/188 R

[56] References Cited

UNITED STATES PATENTS

| | | | |
|---|---|---|---|
| 1,795,212 | 3/1931 | Joly | 179/2 DP |
| 2,007,669 | 7/1935 | Yates | 179/2 A |
| 3,474,434 | 10/1969 | Lindberg | 340/188 |
| 3,614,318 | 10/1971 | Klose | 178/68 |

*Primary Examiner*—Kathleen H. Claffy
*Assistant Examiner*—David L. Stewart
*Attorney*—John B. Frisone et al.

[57] ABSTRACT

Simultaneous two-way communications over a single channel are provided by controlled time modulated polarity changes and simultaneous resistance measurements.

9 Claims, 6 Drawing Figures

METHOD AND DEVICE FOR TWO-WAY TRANSMISSION BY MEANS OF TWO-WIRE TRANSMISSION CHANNEL

FIELD OF THE INVENTION

This invention relates to a method and a device for providing two-way data transmission via a transmission channel and more specifically to a device comprising a central unit and a terminal unit which are connected to each other by means of a two-wire transmission channel for simultaneous data transmission from the central unit to the terminal unit and from the terminal unit to the central unit.

DESCRIPTION OF THE PRIOR ART

U.S. Pat. No. 3,614,318 shows how data transmission can be carried out between a central unit and one or several connected terminal units. The data transmission takes place via a two-wire transmission channel by means of a polarity change initiated at the central unit. Data is transferred from the central unit to the terminal unit by stepping information into the terminal unit by means of this polarity change. It is also possible to receive data in the central unit from the terminal by means of resistance measuring in the central unit of resistance data in the terminal unit.

There are, however, disadvantages in this system since a terminal unit cannot be used simultaneously as a data receiver unit and a data sending unit. In some applications it is advantageous to be able to send data simultaneously in both directions on the data transmission channel between a central unit and a terminal unit.

SUMMARY OF THE INVENTION

In accordance with this invention data transmission is effected between a central unit and a terminal unit so that a transmitter and a receiver in the terminal unit are connected in parallel to the input of the data transmission channel. Data is transmitted from the central unit to the receiver in the terminal unit by means of time modulated polarity change pulses. Simultaneously data is transmitted from the transmitter in the terminal unit to the central unit by means of resistance measuring in the central unit.

DESCRIPTION OF THE DRAWINGS

In FIG. 1 a central unit 1 is connected to a terminal unit 2 by means of two-wire transmission channel L1, L2. The first transmission wire is designated 11 and the second transmission wire 12. In the central unit 1 a positive power supply 5 is connected through a resistor 7 to a first input of a resistance meter 3. A connecting point 6 at ground potential is connected via a resistor 8 to the other input of the resistance meter 3. This other input is also connected to a common output for a double pole double-throw switch 9, 10. The connecting point for meter 3 and resistor 7 is partly connected to the other output of the switch 10, partly to the other output of switch 9. A control relay 4 is adapted to simultaneously switch both switch 9 and 10.

Figure 1:
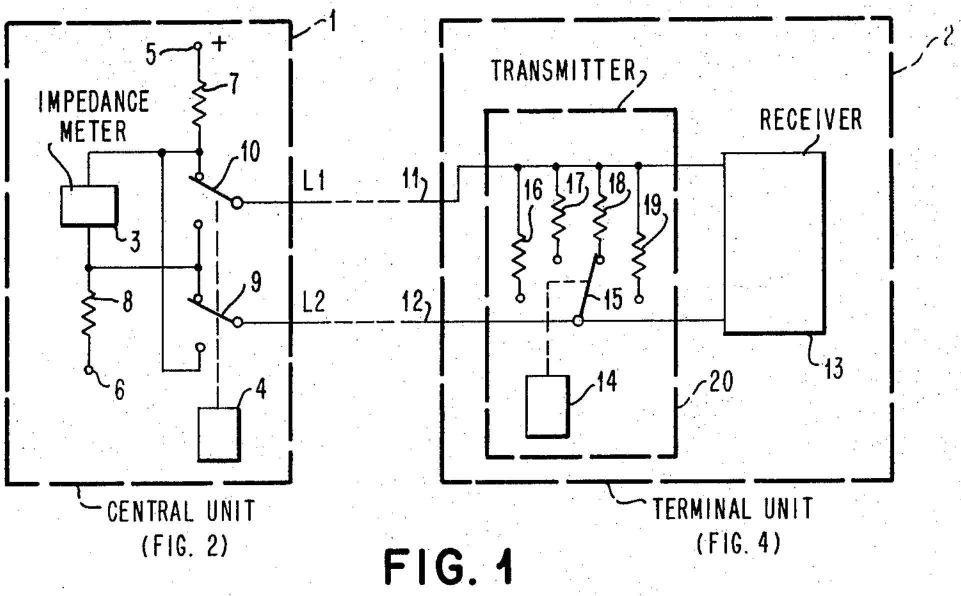
FIG. 1 is a schematic block diagram of a data transmission system in accordance with the invention.

In the terminal unit 2 transmitter 20 is connected to the input wires 11 and 12 in such a way that one of four resistors 16–19 by means of an armature 15 connects the input wire 11 to the input wire 12. A control relay 14 controls the setting of the armature 15 at a preferred resistance. A receiver 13 is connected in parallel with the transmitter 20 to the input wires 11 and 12.

The circuit, according to FIG. 1, operates in the following way. Data is transmitted from the central unit 1 to the terminal unit 2 by means of successive polarity changes on the transmission wires 11 and 12. This polarity change is achieved by means of the control relay 4 through successive changes of the switches 9 and 10 between a first and a second state. Synchronously with this polarity change stepping device, e.g., a ring-counter, is stepped in the receiver 13 of the terminal unit. The transmitted stepping pulses can, for example, be coded so that a long step-pulse has a data value 1 and a short step-pulse has a data value 0. This means that a central unit sends out data signals having a value 1 by means of a control relay 4 initiating a polarity change with a long interval, and data signals having a value 0 by means of polarity changes having short intervals.

According to FIG. 1, it can be seen that at the same time as a central unit sends data to the receiver 13 in the terminal unit by means of the control relay 4, the impedance meter 3 in the central unit can read information from the transmitter 20 in the terminal unit. In accordance with the example shown in FIG. 1, a resistance meter 3 will read the resistance value for the resistor 18 in the terminal unit. The control relay 14 in the transmitter 20 in the terminal unit controls the setting up of the resistance value in the transmitter. The set-up of the transmitter 20 by means of the control relay 14 and the armature 15 can be performed completely independently from the data transmission from the central unit to the terminal unit. It is, of course, also possible to connect the receiver 13 in the terminal unit for controlling the transmitter control relay 14.

Figure 2:
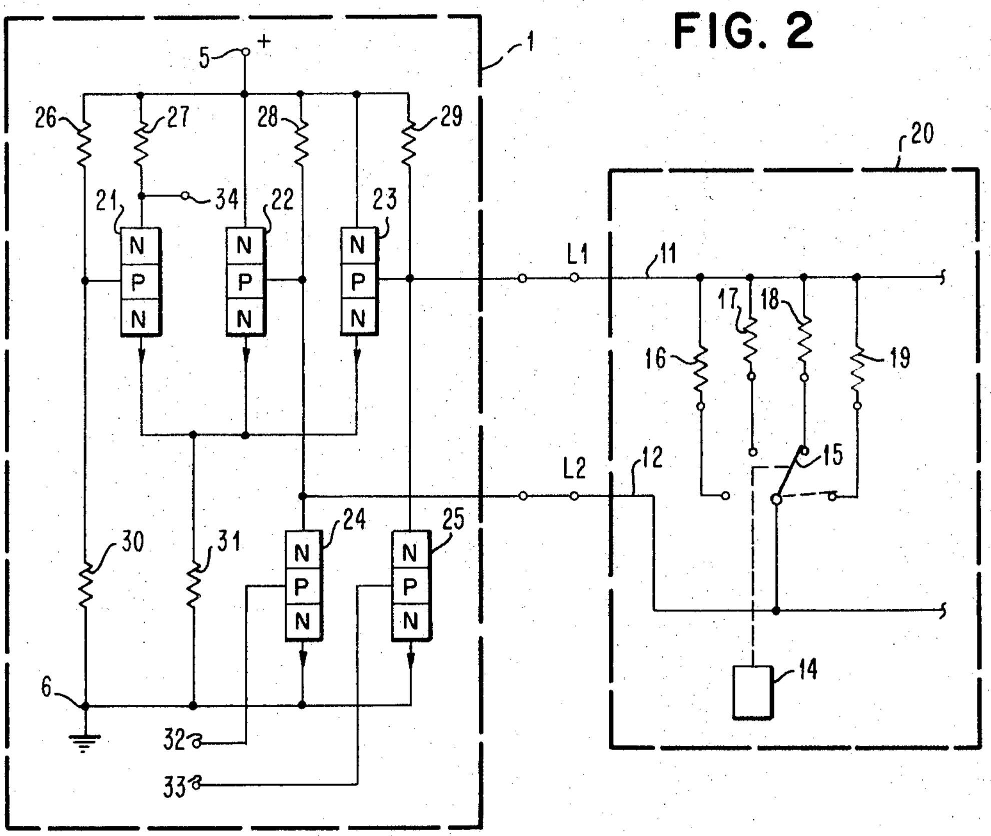
FIG. 2 is a schematic diagram of the receiver and the transmitter in the terminal unit.
Figure 3:
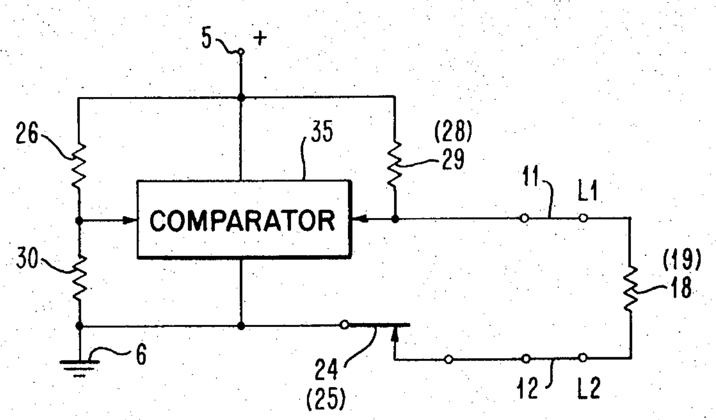
FIG. 3 shows the principle of the resistance measuring in the central unit.

The data transmission from the transmitter 20 in the terminal unit to the central unit 1 will now be described in more detail in connection with FIG. 2 and FIG. 3. The polarity change of transmission lines L1 and L2 (11, 12) is produced through alternatively applying an input signal to the inputs 32 and 33. When an input signal is applied to the input 32, a transistor 24 will conduct. This means that the transmission line L2 will have the same potential as the clamp 6, i.e., earth potential. However, the transistor 25 is not conducting and the transmission line L1 receives through a resistor 29 a positive potential from the positive source 5. This potential will be connected through resistor 18 of the transmitter 20 and the switch 15 to the line L2 and through conducting transistor 24 to earth potential 6. This circuit state is illustrated by the circuit of FIG. 3. If the resistors 29 and 26 are equal, it will be the resistors 18 and 30 which determine the output of the comparator 35. This comparator, which comprises transistors 21 and 23 in FIG. 2, will then create an output signal from the point 34, said signal being a high level signal or a low level signal depending upon the relation between the resistor 18 and 30.

If, however, the input 33 will get an input signal but no input will be applied to the input 32, the transistor 25 will conduct but the transistor 24 will be cut off. This means that the equivalence circuit in FIG. 3 will represent the state indicated by the reference numerals in parentheses, and this is valid for the case when the switch 15 in FIG. 2 has been switched to the position indicated by the dotted level. The comparator 35 according to FIG. 3 and the output 34 according to FIG. 2 will then send out an output depending on the relation between resistors 19 and 30.

Figure 4:
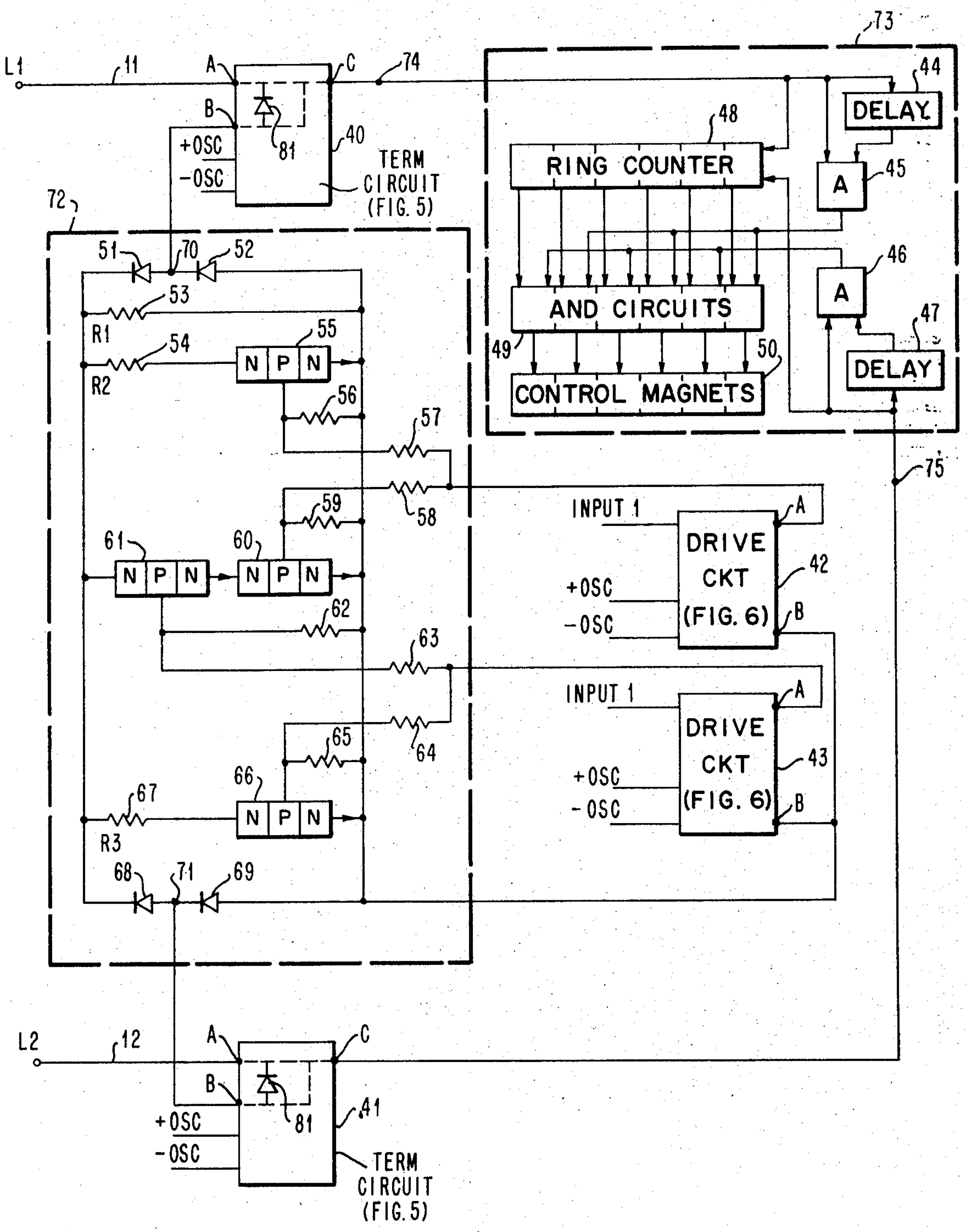
FIG. 4 shows a more detailed illustration of the terminal unit illustrated in FIG. 1.

The terminal unit 2 according to FIG. 1 will now be described in more detail in accordance with FIG. 4.

The input lines L1 and L2 (11, 12) are terminated by two circuits 40 and 41. These circuits are connected partly by their output clamp B to a transmitter 72 which corresponds to the transmitter 20 in FIG. 1, and partly by the output C to receiver 73 corresponding to the receiver 13 in FIG. 1. Two drive circuits 42 and 43 are also connected through transmitter 72, said drive circuits corresponding to the control relay 14 in the transmitter 20 in FIG. 1.

In order to describe the operation of transmitter 72, it will be assumed that the inputs 1 for the drive circuits 42 and 43 are not activated. This means that the transistors 55, 60, 61 and 66 in the transmitter 72 are not conducting. It is further assumed that the positive voltage signal occurs on the input line L1 (11) whereas no input signal occurs on the line L2 (12). The terminal circuit 40 will then be activated so that the circuit will be established from L1 to the input A in the circuit 40, to the output B, the input 70 in a transmitter 72, via a diode 51, a resistor R1 (53), a diode 69 to the output 71 of the transmitter 72, and via the input B of the circuit 41 to the output A and to line L2. This means that the resistance meter in the central unit will sense substantially the resistance value R1 (53) between the lines L1 and L2.

If now a polarity change occurs on the input lines L1 and L2 so that L2 receives an input signal potential whereas L1 receives no signal, the same resistance value R1 will be sensed between the lines L1 and L2 provided that the input 1 for the drive circuits 42 and 43 are not energized. A circuit will then be closed from L2 via input A in circuit 41, point B, point 71 in the transmitter 72, diode 68, resistor R1, diode 52, point B in circuit 40, point A to line L1.

Figure 5:
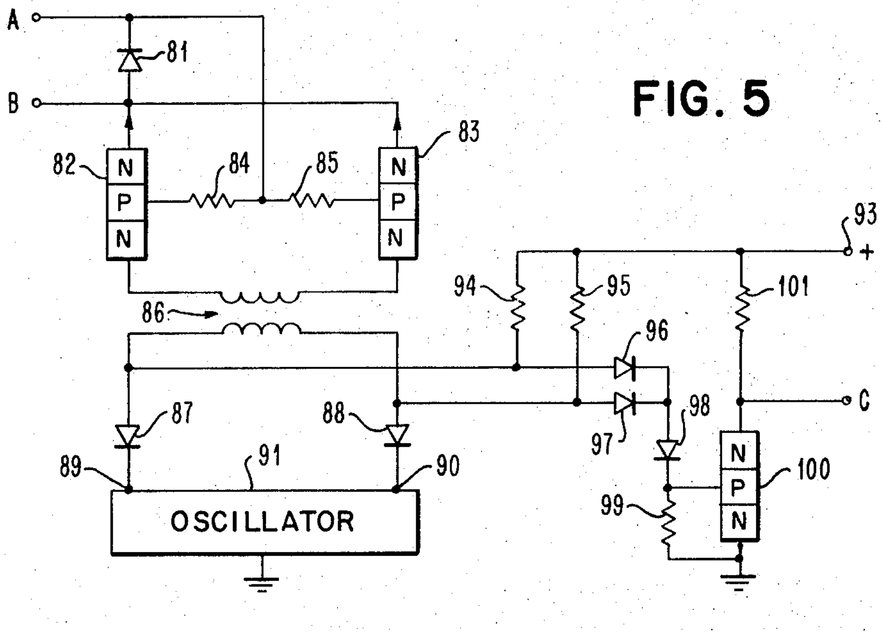
FIG. 5 illustrates in more detail circuits 40 and 41 of FIG. 4.

The terminal circuits 40 and 41 which will be described in detail in FIG. 5 are operating in such a way that a positive signal on the input A activates the outputs B and C. Further, a signal path from the point B to point A will always exist through a diode 81.

An input signal on the input 1 of the drive circuit 42 generates an output signal on the point A. This signal will be transferred through a resistor 57 to the base of the transistor 55 and this transistor will be conducting. Simultaneously a signal will be transferred through a resistor 58 to the base of a transistor 60 and make this transistor conducting. If, however, no input signal is applied to the driving circuit 43, the transistors 61 and 66 will not be conducting. In the same way as described above, it can be seen that a circuit will be established between the lines L1 and L2 through the transmitter 72 whereby this circuit comprises a resistance value which mainly depends upon a parallel connection of a resistor R1 and the resistor R2 (54) connected in series with transistor 55.

If the input 1 of the drive circuit 43 is also activated, its output A will send a signal through a resistor 63 to the base of a transistor 61 and through a resistor 64 to the base of the transistor 66. This makes the transistors 61 and 66 conducting. By means of the serial connection of the transistors 60 and 61 a short circuiting of a bridge circuit between 70 and 71 is made in the transmitter 72. This means that the resistance value between L1 and L2 will be reduced to the inner resistance of the terminal circuits 40 and 41.

If, however, no input signal is provided for the drive circuit 42 but an input signal is applied to the input of the drive circuit 43, the transistors 61 and 66 will conduct whereas transistors 55 and 60 will be cut off. This will result in a resistance value corresponding to a parallel connection of resistance R1 (53) and R3 (67) between the points 70 and 71 in the transmitter 72.

The receiver 13 in FIG. 1 corresponds to the receiver 73 in FIG. 4, the operation of which will now be described. If there is an input signal on transmission line L1 but not on the line L2, a signal will be generated in the circuit 40 from the point C to the input point 74 of the receiver 73. This means that a stepping pulse will be fed from the point 74 to a ring counter 48. Simultaneously this signal will be applied to the AND circuit 45 and to delays 44. If the input signal on line L1 and thus the signal at point 74 represents a long pulse, the delay circuit 44 will after a given delay activate the AND circuit 45. This means that the AND circuit 45 will provide a gate signal to AND circuits 49 whereby an activating pulse from the first step of the ring counter 48 can pass the AND circuit 49 and energize a control magnet in a circuit 50. If, however, the signal on line L1 and at the point 74 is a short pulse, the delay circuit 44 will not be able to provide an output signal in time before the signal to the second input of the AND circuit 45 disappears. This means that the AND circuit 45 will not provide a gate signal to the AND circuit 49. When a polarity change then occurs on the lines L1 and L2, the line L2 will provide a high level signal, whereby the output C of the terminal circuit 41 provides a signal to the input 75 of the receiver 73. This signal will step the ring counter 48 to the second stage. Similarly, as described above, it can be seen that if this signal has a long duration the AND circuit 46 will be activated partly from a delay circuit 47 and from the input point 75 to provide a gate signal to the AND circuit 49. This means that a signal generated by a second step of the ring counter 48 will pass the AND circuit 49 and activate control magnets in the circuit 50. If, however, the input signal from the input 75 has a short duration, the circuit 46 will never provide a gate signal resulting in that control magnet 50 will not be activated. This means that the ring counter 48 will be stepped forward step by step by means of polarity changes whereby control magnets 50 are selectively energized by the input signals having a long duration.

The operation of the terminal circuits 40 and 41 will now be described in connection with FIG. 5. It can be seen that if no input signal appears at point A, i.e., point A has a low signal level, a circuit will be provided from point B via a diode 81 to point A. It can also be seen that point A will provide base resistors 84 and 85 of transistors 82 and 83 with a low bias thereby setting these transistors 82 and 83 in a non-conducting state.

This means that the primary winding of the transformer 86 has a high impedance state whereby the secondary winding of transformer 86 has a high impedance state also.

An oscillator 91 is connected to the secondary side of transformer 86 by means of two diodes 87 and 88. A voltage source 93 is also connected by means of a resistor 94 and a resistor 95 to the diodes 87 and 88 and also via diodes 96 and 97 and a further diode 98 to the base of a transistor 100. The collector of this transistor is connected to the output C of this circuit and via a resistor 101 to the voltage source 93.

If the secondary winding of the transformer 86 is in a high impedance state, diodes 96 and 97 will alternatively receive high signal levels synchronously with oscillator 91. When, for instance, point 89 of oscillator 91 has a low signal level and point 90 a high signal level, a circuit will be established from voltage source 93 through the resistor 94 and diode 87 to point 89. This means a low signal level input to diode 96. No circuit will, however, be established from the resistor 95 and diode 88 to the high level point 90. Consequently, the diode 97 will receive a high level signal which will be transferred to the base of transistor 100. The transistor 100 will conduct and the output C will provide a low signal level, similar to the low signal level applied to point A. During the second half period for oscillator 91 point 90 will provide a low signal level and point 89 a high signal level resulting in a high signal input to diode 96 and a low signal input to diode 97. Transistor 100 will again be conducting but this time via diode 96.

If, however, a high input signal level appears on input point A, transistors 82 and 83 will conduct due to the input signals on base resistors 84 and 85. This will result in a short circuiting for the primary winding of transformer 86 resulting in a low impedance state for the secondary winding of transformer 86. If output 89 of oscillator 91 is at a low level state and output 90 at a high level state, a circuit will be closed from voltage source 93 via resistor 94 and diode 87 to point 89 as described earlier. However, another circuit is also established from voltage source 93 through resistor 95, the secondary winding of transformer 86 and diode 87 to point 89. This means that both diodes 96 and 97 receive a low level bias voltage resulting in a low level input signal being provided to the base of transistor 100. Transistor 100 will then be cut off and a high level output signal will appear on output C. During the following half period of oscillator 91, output 90 will be in a low level state and output 89 in a high level state. A circuit will then be closed from voltage supply 93 via resistor 95 and diode 88 and also from voltage source 93 via resistor 94, the secondary winding of transformer 86 and diode 88 to point 90. Consequently, transistor 100 receives at the base a low level signal whereby output C will be held at a high signal level. It can, therefore, be seen that output C follows the signal level of input A. It can also be seen that when a high level signal occurs at input A, a circuit will be established via base resistors 84 and 85 and conducting transistors 82 and 83 to output B.

Figure 6:
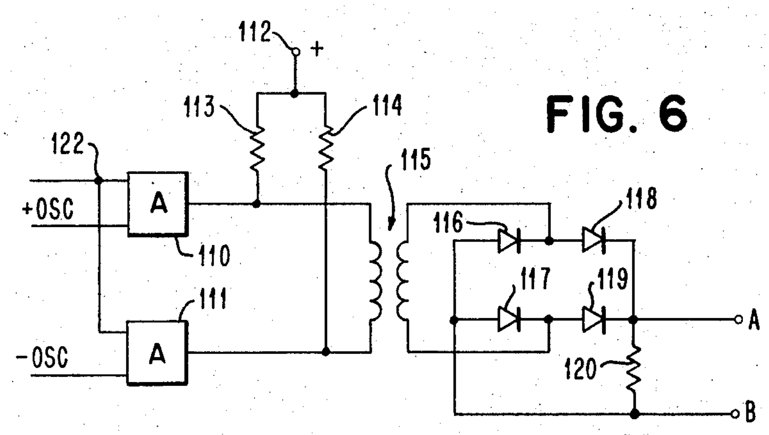
FIG. 6 illustrates in more detail driving circuits 42 and 43 of FIG. 4.

Drive circuits 42 and 43 in FIG. 4 will now be described in more detail in connection with FIG. 6.

Input 122 is connected as a first input to a first AND circuit 110 and to a second AND circuit 111. The second input to the AND circuit 110 consists of a first output (+OSC) from an oscillator and the second input to AND circuit 111 consists of the other output (−OSC) from the oscillator. The output from AND circuit 110 is connected to the primary winding of the transformer 115 and via resistor 113 to a voltage source 112. The output from AND gate 111 is connected to the primary winding of transformer 115 and through resistor 114 to voltage source 112. The secondary winding of transformer 115 is connected to two diodes 116 and 118 and further to two other diodes 117 and 119. The outputs from diodes 118 and 119 are connected to output A of the circuit and the output from diodes 116 and 117 is connected to the second output B for the circuit. A load resistor 120 is connected between outputs A and B.

When an input signal is applied to a point 122, AND circuits 110 and 111 are enabled. Since the other inputs to these AND circuits are connected to outputs from an oscillator, these AND circuits will be activated alternately in synchronism with the operation of the oscillator. This means that a current flow through the primary winding of transformer 115 will pulsate synchronously with the operation of the oscillator. The secondary winding of transformer 115 will then drive a current through rectifier circuit 116–119 to outputs A and B, providing a high level signal for A and a low level signal for B.

If, however, no input signal is applied to point 122, there will be no energizing of gates 110 and 111. This means that no current will flow through transformer 115 and no signal will be generated from output A.

To summarize, it can be said that the data transmission system according to FIG. 1, as it is described in more detail in connection with FIGS. 2–5, can be used for a two-way data transmission between a central unit 1 and a terminal unit 2 via a two-wire connection (L1, L2). This data transmission can be carried out by means of various transmission modes.

If only data has to be sent from terminal unit 2 to central unit 1, receiver 13 according to FIG. 1 can be stepped by means of polarity changes in central unit 1, whereby a receiver 13 is arranged to control the control magnet 14 in transmitter 20. Central unit 1 then senses the resistance values set up in transmitter 20. According to FIG. 4, this means that control magnets 50 are used to control the input signals to the inputs 1 of drive circuits 42 and 43.

According to another transmission mode, the system according to FIG. 1 is used for data transmission from the central unit to the terminal unit. Receiver 13 will then be stepped forward by means of polarity changes in central unit 1, whereby polarity state of long duration means a binary one and a polarity state of short duration means a binary zero. Thereby selective control magnets 50 in FIG. 4 are activated in such a manner as earlier described. Transmitter 20, according to FIG. 1, will be preset to a specific resistance value. A first resistance value can indicate that the terminal unit is ready for receiving data from the central unit. A second resistance value can mean a request for service. A third resistance can indicate a busy state in the terminal unit. A fourth resistance value can indicate an error.

According to a third transmission mode data is transferred from the central unit to the terminal unit and from the terminal unit to the central unit completely asynchronously. The stepping of the receiver 13 occurs in the same way as earlier described whereby long signals mean binary ones and short signals binary zeros.

Simultaneously and independently of the receiver the transmitter 20 is set up at various resistance values which will be sensed by the resistance meter 3 in central unit 1 according to FIG. 1. Transmitter 20 can then operate with a faster or slower frequency than receiver 13. Terminal circuits 40 and 41 connected according to FIG. 4 and having isolating transformers 86 according to FIG. 5 will then provide the means for the independent operation of the transmitter (20, 72) and the receiver (13, 73).

Independently of the used transmission mode, the central unit can reset the terminal, e.g., by switching the switch 10 in FIG. 1 without simultaneously switching switch 9. This means that both transmission lines L1 and L2 will be connected to the same polarity, e.g., to earth.

While the invention has been particularly shown and described with reference to preferred embodiments thereof, it will be understood by those skilled in the art that various changes in form and details may be made therein without departing from the spirit and scope of the invention.

What is claimed is:

1. A method for simultaneous bidirectional transmission of coded information between a first and a second station connected by a two-wire transmission medium comprising the steps of:

at said first station generating successive polarity state changes on the two-wire transmission medium interconnecting the first and second station, said polarity states persisting between changes for at least two different time intervals for transmitting coded information to said second station, and monitoring during each state the impedance between the two-conductor transmission medium for detecting one of at least two different impedance values for receiving coded information from said second station; and at said second station monitoring said two-conductor transmission medium to detect the time intervals of the successive polarity states for receiving coded information and selecting one of at least two different impedance values for connection across the two-conductor transmission medium during each polarity state for transmitting coded information to said first station.

2. The method set forth in claim 1 in which said polarity states persist for two different time intervals, the shorter of the two intervals is used to encode one binary state and the longer interval is used to encode the other binary state.

3. The method set forth in claim 1 in which at least two different impedance values are selectable at the second station, the first value encoding one binary state and the second value encoding the other binary state.

4. The method set forth in claim 3 in which at least one additional impedance value is selectable and encodes control information.

5. The method set forth in claim 1 in which:

said polarity states persist for two different time intervals, the shorter of the two intervals is used to encode one binary state and the longer interval is used to encode the other binary state;

at least two different impedance values are selectable at the second station, the first value encoding one binary state and the second value encoding the other binary state;

and at least one additional impedance value is selectable and encodes control information.

6. A communications system for simultaneous bidirectional transmission of coded information between a first and second station over a two-conductor transmission medium interconnecting the first and second station comprising:

a voltage source at said first station, means for alternately connecting said voltage source to the transmission medium with one, then the opposite polarity, control means for selectively operating said means for alternately connecting the voltage source to the medium to cause said polarity connections to persist for at least two different time intervals for transmitting coded information to said second station, receiver means at said second station for measuring the time duration of each polarity state and providing a signal indicative of the time duration, means responsive to outputs provided by said receiver means for manifesting the received information from the first station contained in the time duration of the polarity states, means at said second station for selectively changing the impedance between the two conductors of the medium to one of at least two valves for transmitting coded information to the first station, and means at said first station measuring the impedance across the medium during each polarity state to detect the information transmitted from the second station to the first station.

7. A communications system as set forth in claim 6 in which the polarity connections persist for two different time intervals, the shorter of the two intervals is selected to transmit one binary value and the longer selected to transmit the other binary value.

8. A communications system as set forth in claim 6 in which the means at said second station selects one from two impedance values for transmitting one binary state to the first station and the other value for transmitting the other binary state to the first station.

9. A communications system as set forth in claim 8 in which the selection means at the second station selects at least one additional impedance value for transmitting control information to the first station.

* * * * *